United States Patent
Li et al.

(10) Patent No.: US 8,062,621 B2
(45) Date of Patent: Nov. 22, 2011

(54) METHOD OF MANUFACTURING TITANIUM DIOXIDE PARTICLES DOPED WITH RARE EARTH ELEMENT

(75) Inventors: Jiguang Li, Tsukuba (JP); Takamasa Ishigaki, Tsukuba (JP)

(73) Assignee: National Institute For Materials Science, Ibaraki (JP)

( * ) Notice: Subject to any disclaimer, the term of this patent is extended or adjusted under 35 U.S.C. 154(b) by 1004 days.

(21) Appl. No.: 11/922,342

(22) PCT Filed: Jun. 15, 2006

(86) PCT No.: PCT/JP2006/312460
§ 371 (c)(1),
(2), (4) Date: Dec. 17, 2007

(87) PCT Pub. No.: WO2006/135104
PCT Pub. Date: Dec. 21, 2006

(65) Prior Publication Data
US 2009/0110929 A1    Apr. 30, 2009

(30) Foreign Application Priority Data
Jun. 17, 2005   (JP) ................................ 2005-177077

(51) Int. Cl.
*C01G 1/00* (2006.01)
(52) U.S. Cl. ......... 423/610; 423/275; 423/266; 423/611
(58) Field of Classification Search .......... 423/610–612, 423/615, 616, 263–275; 252/301.4 F
See application file for complete search history.

(56) References Cited

U.S. PATENT DOCUMENTS
2003/0124043 A1 * 7/2003 Yadav et al. .................. 423/263

FOREIGN PATENT DOCUMENTS
JP     H08-109375      4/1996
WO   WO 2005/090516   9/2005

OTHER PUBLICATIONS

James Ovenstone et al., A study of the Effects of Europium doping and Calcination on the Luminescence of Titania Phosphor Materials, J.Phys. Chem. B, vol. 105, No. 30,2001, p. 7170-7177.
Li Lin et al., Phosphor-doped Titania—a Novel Photocatalyst Active in Visibhle Light, Chemistry Letters, vol. 34, No. 3, Mar. 5, 2005, p. 284-285.

* cited by examiner

*Primary Examiner* — Steven Bos
(74) *Attorney, Agent, or Firm* — Manabu Kanesaka

(57) ABSTRACT

A method of manufacturing titanium dioxide particles can produce titanium dioxide particles where a rare earth element is substituted at the titanium sites from which it is possible to highly efficiently take out fluorescence attributable to the rare earth element The method of manufacturing titanium dioxide particles doped with a rare earth element comprises a step of preparing a liquid precursor containing a titanium source and rare earth metal source, the doping ratio of the rare earth element in the liquid precursor being within a range not less than 0 at % and not more than 5.0 at %, a step of generating thermal plasma and a step of providing the liquid precursor into the thermal plasma

11 Claims, 12 Drawing Sheets

METHOD OF MANUFACTURING TITANIUM DIOXIDE PARTICLES DOPED WITH RARE EARTH ELEMENT

TECHNICAL FIELD

This invention relates to a method of manufacturing titanium dioxide particles doped with a rare earth element. More particularly, the present invention relates to a method of manufacturing titanium dioxide particles containing a rare earth element substituting at the titanium sites of a titanium dioxide lattice.

BACKGROUND ART

Titanium dioxide is being widely utilized for pigments, cosmetics such as UV creams, photocatalysts, solar cells and so on. It is also being broadly studied. Particularly, nano particles of titanium dioxide are attracting attention because of having various potential applications. Novel techniques relating to titanium dioxide include inserting europium ions ($Eu^{3+}$) among nano sheets of titanium oxide to prepare a light emitting material that emits red light attributable to $Eu^{3+}$ (see, inter alia, Non-Patent Document 1).

Another technique relating to titanium dioxide is a method of manufacturing ceramic powder directly from a mixture or the reaction product of a metal compound and an alkoxide by way of a thermal plasma process (see, inter alia, Patent Document 1).

FIG. 17 schematically illustrates the light emitting mechanism of a light emitting material prepared by inserting europium ions among nano sheets of titanium oxide.

According to known technique of the above cited Non-Patent Document 1, nano sheets of titanium oxide is irradiated with light to excite electrons in a valence band (VB) to move to a conduction band (CD). Electrons that are excited to move to the conduction band are not relaxed to move back directly to the valence band but trapped temporarily in a defect level. Later, such electrons move to the excitation level of $Eu^{3+}$ without being recombined with holes in the valence band. As a result, it becomes possible to take out fluorescence attributable to $Eu^{3+}$.

Such a move of energy from nano sheets of titanium oxide to $Eu^{3+}$ takes place effectively when the energy level of the defect level of the nano sheets of titanium oxide is slightly higher than that of $Eu^{3+}$ in an excited state. Since it is only necessary to excite nano sheets of titanium oxide that is a host compound in order to take out fluorescence attributable to rare earth ions, it is possible to use light of a wavelength that is absorbed by the nano sheets of titanium oxide.

On the other hand, Patent Document 1 describes a method of manufacturing ceramic powder, using (I) a metal compound other than alkoxide having one or more than one metal elements, (II) an alkoxide having one or more than one metal elements, a mixture of (I) and (I) and/or the reaction product of (I) and (II), by way of a thermal plasma process. With such a thermal plasma process, it is possible to obtain ceramic powder without using sintering and crushing steps.

With the technique described in Patent Document 1, it is possible to manufacture highly crystalline ceramic powder by using a precursor obtained by mixing (I) and (II) or causing them to react with each other as starting material.

Reference Documents

Patent Document 1: JP 05-9008-A
Non-Patent Document 1: Xin et al., Appl. Phys. Lett. 2004, 85, 4187

DISCLOSURE OF THE INVENTION

Problem to be Solved by the Invention

However, with the technique described in the above cited Non-Patent Document 1, it is not possible to take out fluorescence attributable to terbium ions ($Tb^{3+}$) because the energy level of the defect level of nano sheets of titanium oxide is lower than that of $Tb^{3+}$ in an excited state when terbium ions ($Tb^{3+}$) are inserted into nano sheets of titanium oxide.

In other words, the above technique has a drawback that it can only take out fluorescence attributable to limited rare earth ions that can satisfy the above energy structure by inserting rare earth ions into nano sheets of titanium oxide.

While the technique described in the above-cited Patent Document 1 is suited for manufacturing multi-composite particles, it is not suited for manufacturing titanium dioxide particles doped with an impurity.

More specifically, an organic solvent or water is used when mixing (I) and (II) and the mixture solution is a slurry solution where (I) or (II) is partly precipitated. This means that, when a rare earth compound and a titanium alkoxide are selected for (I) and (II) respectively, the obtained titanium oxide particles can be those of a composite oxide of titanium and a rare earth element or of titanium oxide and a rare earth oxide and not those where the rare earth element is substituted at the titanium sites in the titanium oxide lattice.

Energy can hardly move from a host compound to a rare earth element in particles of any of such composite oxides and composite matters and hence it is difficult to highly efficiently take out fluorescence attributable to a rare earth element.

Therefore, it is the object of the present invention to provide titanium dioxide particles, more particularly, titanium dioxide particles where a rare earth element is substituted at the titanium sites from which it is possible to highly efficiently take out fluorescence attributable to the rare earth element and also a method of manufacturing such titanium dioxide particles.

Means for Solving the Problem

According to the present invention, the above object is achieved by providing a method of manufacturing titanium dioxide particles doped with a rare earth element, comprising: a step of preparing a liquid precursor containing a titanium source and a rare earth metal source, the doping ratio of the rare earth element in the liquid precursor being within a range not less than 0 at % and not more than 5.0 at %; a step of generating thermal plasma; and a step of providing the liquid precursor into the thermal plasma.

The doping ratio of the rare earth element in the liquid precursor may be within a range not less than 0 at % and not more than 0.5 at %.

The titanium source may be a titanium alkoxide chelate complex and the rare earth metal source may be a rare earth metal compound chelate complex.

The titanium alkoxide chelate complex may contain a titanium alkoxide selected from a group of titanium ethoxide, titanium propoxide and titanium butoxide and an organic solvent selected from a group of diethanolamine, triethanolamine and acetylacetone and the rare earth metal compound chelate complex may contain a rare earth metal non-alkoxide selected from a group of rare earth nitrates, rare earth chlorides, rare earth sulfates and rare earth acetates, citric acid or ethylenediaminetetraacetate and ammonia or a rare earth metal alkoxide selected from a group of rare earth metal ethoxides, rare earth metal propoxides and rare earth metal butoxides and an organic solvent selected from a group of diethanolamine, triethanolamine and acetylacetone.

The titanium source may be a titanium trichloride solution and the rare earth metal source may be a rare earth metal alkoxide.

The rare earth metal alkoxide may be selected from a group of rare earth metal ethoxides, rare earth metal propoxides and rare earth metal butoxides.

The rare earth element may be selected from a group of cerium, praseodymium, neodymium, promethium, samarium, europium, gadolinium, terbium, dysprosium, holmium, erbium, thulium and ytterbium.

When the rare earth metal compound chelate complex contains a rare earth metal non-alkoxide selected from a group of rare earth nitrates, rare earth chlorides, rare earth sulfates and rare earth acetates, citric acid or ethylenediaminetetraacetate and ammonia, the preparation process further includes: a step of mixing the rare earth metal non-alkoxide and the citric acid or ethylenediaminetetraacetate; a step next to the mixing step of mixing the ammonia; and a step next to the mixing step of mixing the titanium alkoxide chelate complex.

The step of mixing ammonia may be so conducted as to make the pH of the rare earth metal compound chelate complex equal to 9.0.

The generating step may be conducted to generate oxygen-containing thermal plasma by means of a plasma generation system selected from a group of an RF induction plasma system, a DC arc plasma system, a DC RF hybrid plasma system and a microwave induction plasma system.

The providing step may be conducted to atomize the liquid precursor.

In titanium dioxide particles doped with a rare earth element according to the present invention, the doping ratio of the rare earth element is within a range not less than 0 at % and not more than 5.0 at % and the rare earth element is substituted for titanium atoms in the unit lattice of titanium dioxide so that the titanium dioxide particles emit light attributable to the rare earth element when the titanium dioxide particles are irradiated with light having the absorption wavelength of titanium dioxide in order to achieve the object.

The doping ratio of the rare earth element is within a range not less than 0 at % and not more than 0.5 at %.

The particle diameter of the titanium dioxide particles may be within a range not less than 5 nm and not more than 100 nm.

The rare earth element may be selected from a group of cerium, praseodymium, neodymium, promethium, samarium, europium, gadolinium, terbium, dysprosium, holmium, erbium, thulium and ytterbium.

The titanium dioxide particles may contain anatase titanium dioxide particles and rutile titanium dioxide particles.

The content ratio of the anatase titanium dioxide particles relative to the titanium dioxide particles may be within a range not less than 0 wt % and less than 100 wt %.

The emission of light attributable to the rare earth element may be produced by irradiating the titanium dioxide particles with light exceeding the absorption wavelength of titanium dioxide and capable of exciting the rare earth element.

Advantages of the Invention

In titanium dioxide particles doped with a rare earth element according to the present invention, the doping ratio of the rare earth element is within a range not less than 0 at % and not more than 5.0 at %, preferably within a range not less than 0 at % and not more than 0.5 at %. The rare earth element is reliably substituted for the titanium atoms in the unit lattice of titanium dioxide when the doping ratio is within the above-defined range.

As the titanium dioxide particles are irradiated with light having the absorption wavelength of titanium dioxide, energy moves highly efficiently from the titanium dioxide to the rare earth element because the rare earth element exists at the titanium sites in the unit lattice of titanium dioxide. Then, as a result, the titanium dioxide particles can emit light attributable to the rare earth element.

A method of manufacturing titanium dioxide particles doped with a rare earth element according to the present invention comprises: a step of preparing a liquid precursor containing a titanium source and a rare earth metal source; a step of generating thermal plasma; and a step of providing the liquid precursor into the thermal plasma.

As liquid sources are used respectively for the titanium source and the rare earth metal source, it is possible to mix titanium and the rare earth without precipitation. Additionally, since the doping ratio of the rare earth element in the liquid precursor is within a range not less than 0 at % and not more than 5.0 at %, it is possible not only to efficiently control the doping ratio but also substituting the rare earth element at the titanium sites.

BRIEF DESCRIPTION OF THE DRAWINGS

FIG. 13 is a graph illustrating the UV-visible diffusion/reflection spectrums of Ex2-1, Ex2-5, Ex2-10, non-doped titanium dioxide and $Eu_2Ti_2O_7$.

FIG. 14 is graph illustrating the excitation spectrum of Ex2-5 and photoluminescence spectrums of doped and non-doped titanium dioxide excited in various different conditions.

FIG. 17 is a schematic illustration of the light emitting mechanism of a light emitting material prepared by inserting europium ions among nano sheets of titanium oxide according to known technique.

| Explanation of Reference Symbols | |
|---|---|
| 200: | plasma reactor |
| 210: | chamber |
| 220: | power supply source |
| 230: | atomizing probe |
| 240: | sheath |
| 250: | filter |
| 260: | vacuum pump |
| 270: | thermal plasma |
| 280: | plasma torch |

BEST MODE FOR CARRYINGT OUT THE INVENTION

Before describing embodiments of the present invention, the principle underlying the present invention will be described below.

Figure 1:
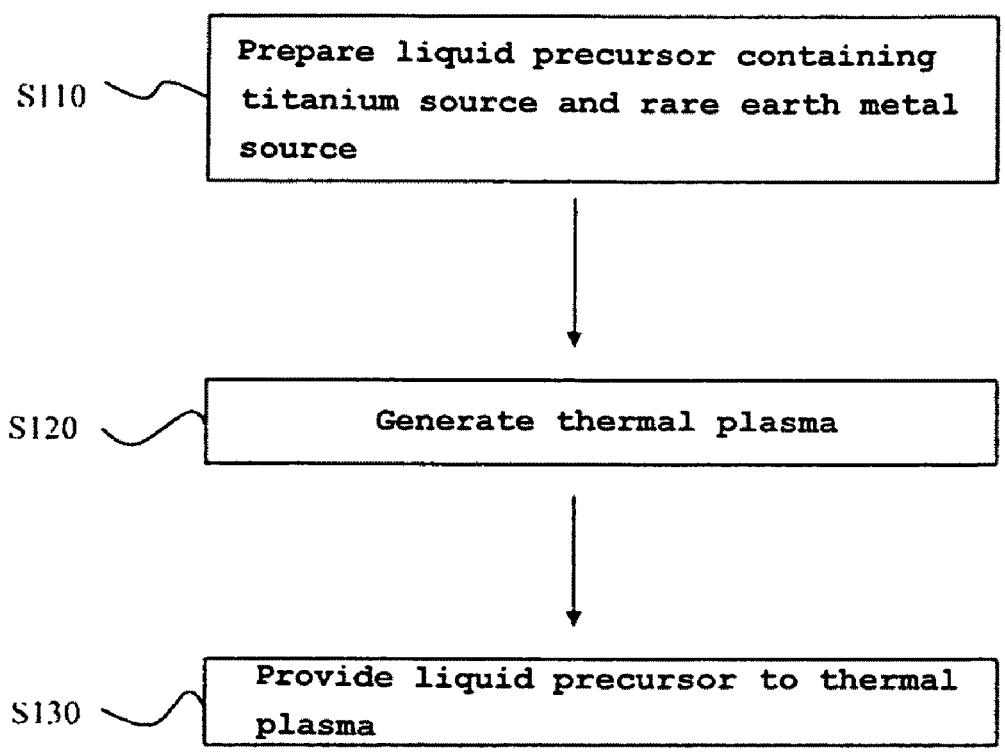
FIG. 1 is a flowchart of the manufacturing method according to the present invention, showing the manufacturing steps thereof.

FIG. 1 is a flowchart of the manufacturing method according to the present invention, showing the manufacturing steps thereof.

Figure 2:
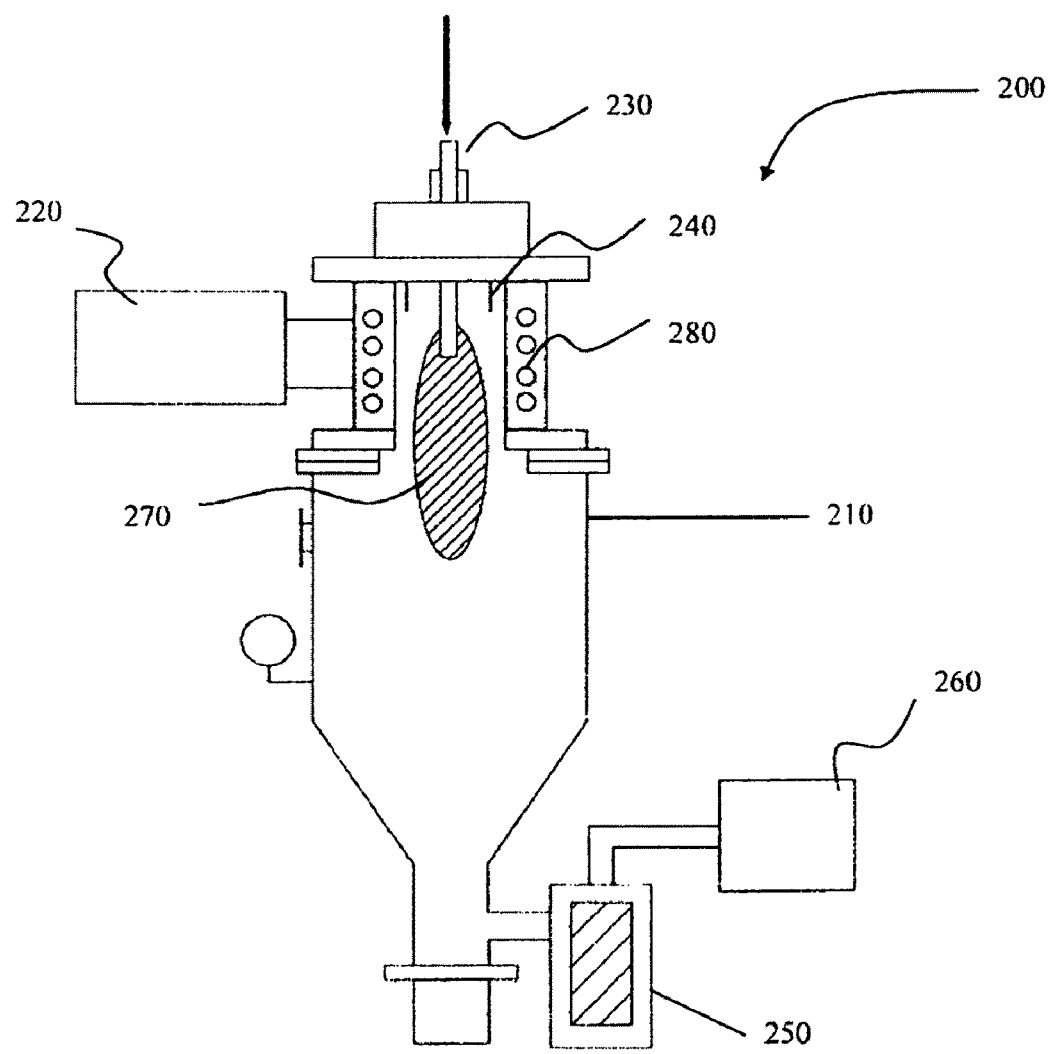
FIG. 2 is a schematic illustration of an apparatus for manufacturing titanium dioxide particles according to the present invention.

FIG. 2 is a schematic illustration of an apparatus for manufacturing titanium dioxide particles according to the present invention.

The steps of the manufacturing method will be described by referring to the plasma reactor 200 in FIG. 2.

Step S110: A liquid precursor containing a titanium source and a rare earth metal source is prepared.

Both the titanium source and the rare earth metal source are solutions. The doping ratio of the rare earth element in the liquid precursor is regulated so as to be within a range not less than 0 at % and not more than 5.0 at %. With the above-cited doping ratio, it is possible to substitute the rare earth element for all the titanium sites in the titanium dioxide lattice and the crystal structure of titanium dioxide can be maintained.

For example, a report on doping gadolinium oxide, which is similar to titanium dioxide, with a rare earth element (Eu) up to 14 at % and a report on doping yttrium oxide with a rare earth element (Tb) up to 6 at % are known. Preferably, the doping ratio of the rare earth element in the liquid precursor is not less than 0 at % and not more than 0.5 at %. The process of substitution proceeds without problem without specifying any particular manufacturing conditions when the content ratio of the rare earth element is within the above range.

As will be described hereinafter, the intensity of emitted light attributable to the rare earth element (rare earth ions) tends to fall when the rare earth element is doped beyond 5.0 at % so that it is desirable that the content ratio of the rare earth element is not more than 5.0 at %.

The expression "doping of a rare earth element" as used in this specification refers to that the rare earth element is substituted for part of the titanium at the titanium sites of a titanium dioxide lattice and it should be noted that any composite particles of titanium dioxide and the rare earth element are not contained there.

Step S120: Thermal plasma 270 is generated in the chamber 210 of the plasma reactor 200.

The pressure in the chamber 210 is adjusted to a range between 10 and 760 Torr by means of the vacuum pump 260. The power supply source 220 generates plasma by means of a frequency of 0.2 MHz to 50 MHz and RFpower of 5 KW to 500 KW. Thermal plasma 270 is generated from gas that contains $O_2$ (oxygen gas) and may typically be $Ar/O_2$ thermal plasma generated from a mixture gas of $O_2$ and Ar supplied from the sheath 240. The power supply source 220 may be selected from a group of an RF induction plasma system, a DC arc plasma system, a DC RF hybrid plasma system and a microwave induction plasma system.

Step S130: The liquid precursor prepared in Step S110 is supplied to the thermal plasma 270. The liquid precursor may be supplied to the chamber 210 by way of an atomizing probe 230. At this time, the liquid precursor may be supplied to the chamber 210 with Ar or $O_2$ carrier gas. As a result, the liquid precursor turns into mist. Since such a misty liquid precursor can be supplied continuously to the thermal plasma 270, it is possible to produce uniform high quality powder. The front end of the atomizing probe 230 is arranged so as to be held in contact with the thermal plasma 270 generated by the power supply source 220. As a matter of course, the liquid precursor may be directly exposed to the thermal plasma 270.

The misty liquid precursor exposed to the thermal plasma 270 is decomposed at high temperature. The decomposed liquid precursor gives rise to a chemical reaction when it is cooled. Then, as a result, stable titanium dioxide particles are produced. Such a reaction process can easily be conceivable to those skilled in the art by analogy. The obtained titanium dioxide particles are collected by way of the chamber 210 and the filter 250.

The starting material does not precipitate in the liquid precursor and is mixed well when liquid is used to supply the starting material and limit the doping ratio of the rare earth element to the above-described range. Then, as a result, it is possible to obtain titanium dioxide particles where the rare earth element is substituted at the titanium sites. The particle diameter of the obtained titanium dioxide particles can be within a range between 5 nm and 100 nm as a result of using a thermal plasma process. Thus, it is possible to obtain titanium dioxide particles having a desired particle diameter by controlling the manufacturing process.

Since the rare earth element is located at the titanium sites, the relationship between the energy level of titanium dioxide and that of rare earth element ions, which is described earlier by referring to FIG. 17, allows energy to move from titanium dioxide to the rare earth element highly efficiently. This is because the physical distance between titanium dioxide and the rare earth element is small if compared with the distance between the titanium oxide nano sheets, which operate as light emitting material, and the rare earth element ions as described in the Non-Patent Document 1 so that interactions can satisfactorily take place.

Now, embodiments of the present invention will be described below by referring to the accompanying drawings.

Embodiment 1

Figure 3:
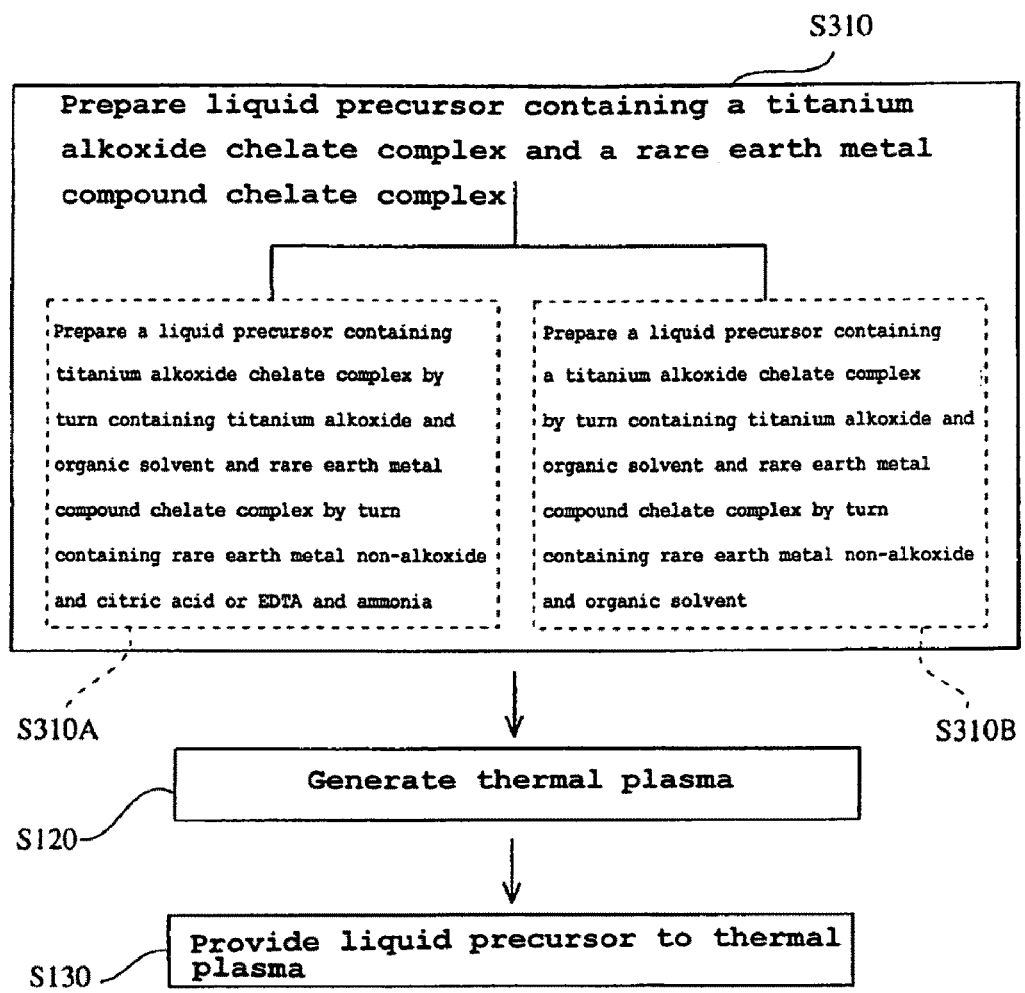
FIG. 3 is a flowchart of Embodiment 1 of manufacturing process according to the present invention.

FIG. 3 is a flowchart of Embodiment 1 of manufacturing process according to the present invention.

Since the steps in FIG. 3 are same as those of FIG. 1 except Step S310, Step S120 and Step S130 will not be described below any further.

Step S310: A mixture containing a titanium alkoxide chelate complex and a rare earth metal compound chelate complex is prepared. The titanium alkoxide chelate complex and the rare earth metal compound chelate complex respectively operate as a titanium source and a rare earth metal source. Both such a titanium alkoxide chelate complex and such a rare earth metal compound chelate complex are liquid. The doping ratio of the rare earth element in the liquid precursor is adjusted to be within a range not less than 0 at % and not more than 5.0 at %.

More particularly, Step S310 may be either Step S310A or Step S310B.

Step S310A: A liquid precursor containing a titanium alkoxide chelate complex, which by turn contains a titanium alkoxide that operates as titanium source and an organic solvent, and a rare earth metal compound chelate complex, which by turn contains a rare earth metal non-alkoxide and citric acid or ethylenediaminetetraacetate (EDTA) and ammonia as rare earth metal source, is prepared.

The titanium alkoxide is selected from a group of titanium ethoxide, titanium propoxide and titanium butoxide. The organic solvent is selected from a group of diethanolamine, triethanolamine and acetylacetone. The above-described organic solvent can operate to stably hold the titanium alkoxide in the solution without precipitation.

The rare earth metal non-alkoxide is selected from a group of rare earth nitrates, rare earth chlorides, rare earth metal sulfates and rare earth acetates. Citric acid or EDTA can operate to stably hold the rare earth metal non-alkoxide in the solution without precipitation.

The rare earth element is selected from a group of cerium, praseodymium, neodymium, promethium, samarium, europium, gadolinium, terbium, dysprosium, holmium, erbium, thulium and ytterbium. Such a rare earth element can be substituted for the titanium in the titanium dioxide lattice and emit light due to the atom size and the electron configuration thereof.

Ammonia operates to prevent citric acid or EDTA from hydrolyzing the titanium alkoxide by turning the rare earth metal compound chelate complex that contains citric acid or EDTA, which is acidic, alkaline. Preferably, ammonia is mixed so as to make the pH of the rare earth metal compound chelate complex equal to 9.0.

More specifically, firstly the rare earth metal non-alkoxide and citric acid or EDTA, which is acidic, are mixed with each other. As a result, the rare earth metal non-alkoxide is prevented from precipitating. Then, ammonia is mixed with the mixture solution to produce a rare earth metal compound chelate complex. As a result, the pH of the rare earth metal compound chelate complex is adjusted and the complex becomes alkaline. Thereafter, the rare earth metal compound chelate complex whose pH has been adjusted is mixed with a titanium alkoxide chelate complex that contains titanium alkoxide and an organic solvent to prepare a liquid precursor. As the mixings are conducted in the above-described order, the rare earth metal non-alkoxide and the titanium alkoxide are prevented from precipitating and additionally the titanium alkoxide is prevented from hydrolyzing.

The liquid precursor prepared in this way does not give rise to any precipitation because of the effect of the organic solvent and citric acid or EDTA and the titanium alkoxide chelate complex and the rare earth metal compound chelate complex can be mixed well in it. It should be noted here that, as a result of intensive research efforts, the inventors of the present invention found a combination of an organic solvent and citric acid or EDTA that operates to stably hold both the titanium alkoxide and the rare earth metal non-alkoxide and mixes them well.

Step S310B: A liquid precursor containing a titanium alkoxide chelate complex, which by turn contains a titanium alkoxide that operates as titanium source and an organic solvent, and a rare earth metal compound chelate complex, which by turn contains a rare earth metal alkoxide that operates as rare earth metal source and an organic solvent, is prepared.

In this case again, as in Step S310A, the titanium alkoxide is selected from a group of titanium ethoxide, titanium propoxide and titanium butoxide. The organic solvent is selected from a group of diethanolamine, triethanolamine and acetylacetone.

The rare earth metal alkoxide is selected from a group of rare earth metal ethoxides, rare earth metal propoxides and rare earth metal butoxides. The organic solvent is selected from a group of diethanolamine, triethanolamine and acetylacetone as in the case of the titanium alkoxide chelate complex. In this case again, the organic solvent selected from the above group can operate to stably hold the rare earth metal alkoxide in the solution without precipitation.

The rare earth element is selected from a group of cerium, praseodymium, neodymium, promethium, samarium, europium, gadolinium, terbium, dysprosium, holmium, erbium, thulium and ytterbium.

The titanium alkoxide chelate complex and the rare earth metal compound chelate complex can be mixed with each other well without precipitating due to the effect of the organic solvent in the liquid precursor that is prepared in this way. It should be noted here that, as a result of intensive research efforts, the inventors of the present invention found a combination of organic solvents that operates to stably hold both the titanium alkoxide and the rare earth metal alkoxide and mixes them well. It is not necessary to adjust the pH in Step S310B.

The following steps may be same as Step S120 and Step S130 described above by referring to FIG. 1.

When the doping ratio of the rare earth element in the liquid precursor is adjusted within a range not less than 0 at % and not more than 0.5 at %, it is possible to obtain titanium dioxide particles doped with a rare earth element with ease because the manufacturing process does not need to be subjected to a number of restrictions including conditions for generating thermal plasma 270.

Embodiment 2

Figure 4:
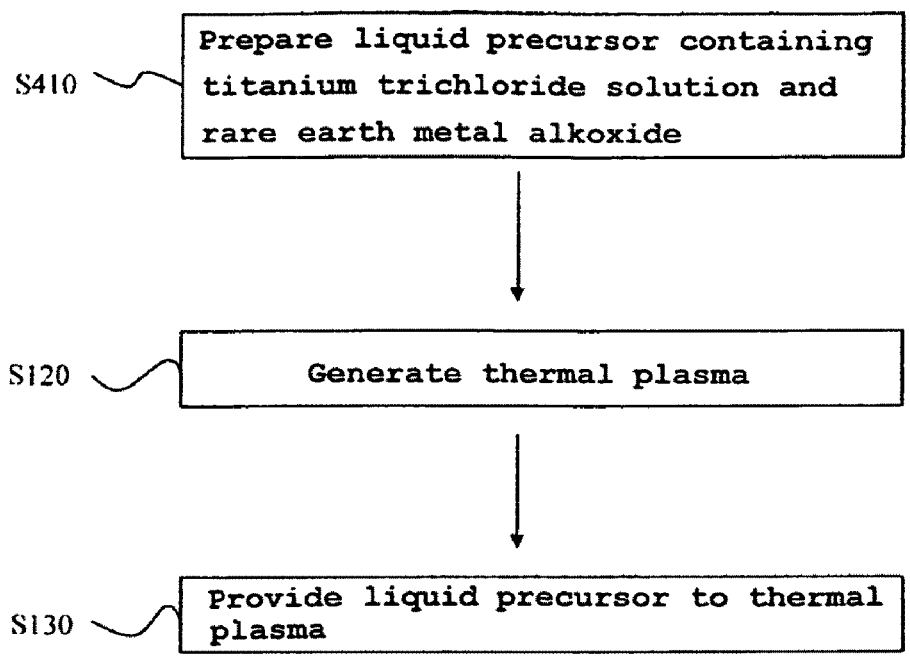
FIG. 4 is a flowchart of Embodiment 2 of manufacturing process according to the present invention.

FIG. 4 is a flowchart of Embodiment 2 of manufacturing process according to the present invention.

Since the steps in FIG. 4 are same as those of FIG. 1 except Step S410, Step S120 and Step S130 will not be described below any further.

Step S410: A mixture containing a titanium trichloride solution and a rare earth metal alkoxide is prepared. The titanium trichloride solution and the rare earth metal alkoxide respectively operate as a titanium source and a rare earth metal source. Both such a titanium trichloride solution and such a rare earth metal alkoxide are liquid. The doping ratio of the rare earth element in the liquid precursor is adjusted to be within a range not less than 0 at % and not more than 5.0 at %.

The rare earth metal alkoxide is selected from a group of rare earth metal ethoxides, rare earth metal propoxides and rare earth metal butoxides. The rare earth element is selected from a group of cerium, praseodymium, neodymium, promethium, samarium, europium, gadolinium, terbium, dysprosium, holmium, erbium, thulium and ytterbium.

The titanium trichloride solution is more stable and more easily handlable if compared with the titanium alkoxide of Embodiment 1. Therefore, Embodiment 2 provides an advantage that the precursor solution thereof can be prepared easier than Embodiment 1.

The following steps may be same as Step S120 and Step S130 described above by referring to FIG. 1.

As described above for Embodiment 1, when the doping ratio of the rare earth element in the liquid precursor is adjusted within a range not less than 0 at % and not more than 0.5 at % in Step S410, it is possible to obtain titanium dioxide particles doped with a rare earth element with ease because the manufacturing process does not need to be subjected to a number of restrictions including conditions for generating thermal plasma 270.

Now, the present invention will be described further by way of examples, although it should be noted that the present invention is by no means limited to the examples.

EXAMPLE 1

Specimens of titanium dioxide particles (hereinafter referred to as Er—$TiO_2$) doped with erbium to different doping ratios were manufactured from respective liquid precursors, each containing a titanium alkoxide chelate complex, which by turn contains titanium butoxide as titanium alkoxide and diethanolamine as organic solvent for stabilizing titanium butoxide, and a rare earth metal compound chelate complex, which by turn contains erbium nitrate as rare earth metal non-alkoxide and citric acid.

Referring to FIG. 2, the manufacturing system included a stainless-steel-made reactor 210, an RF power supply system 220, a stainless-steel-made filter 250 and a plasma torch (Model PL-50: tradename, available from TEKNA Plasma system Inc. Ltd., Canada) 280.

Each of the liquid precursors contained a titanium alkoxide chelate complex by turn containing 0.1 mol of titanium butoxide and 0.4 mol of diethanolamine, a rare earth metal non-alkoxide chelate complex by turn containing erbium nitrate to a predetermined ratio (erbirum doping ratios of the specimens: 0.25 at %, 0.5 at %, 1.0 at % and 3.0 at %) and citric acid and 20 ml of distilled water. Citric acid and erbium nitrate were mixed to show a mol ratio of 1:1.

Each of the liquid precursors obtained in this way was then supplied to the center of thermal plasma 270 (FIG. 2) with Ar carrier gas (5 L/min) by way of an atomizing probe 230 (FIG. 2). The supply rate of the liquid precursor was 4.5 g/min. The thermal plasma 270 was generated by a mixture gas of Ar and $O_2$. The flow rate of the mixture gas was 90 L/min. The output of the RF power supply system 220 for generating thermal plasma was 25 kW and the pressure of the stainless-steel-made reactor 210 was 500 torr. The above manufacturing conditions were listed in Table 1 below.

TABLE 1

| Parameter | numerical value |
| --- | --- |
| sheath gas and flow rate | Ar + $O_2$, 90 L/min |
| atomized gas and flow rate | Ar, 5 L/min |
| precursor supply rate | 4.5 g/min |
| induction power | 25 kW |
| chamber pressure | 500 torr |

The produced titanium dioxide particles were collected from the lateral wall of the stainless-steel-made reactor 210 and the filter 250 as specimens. The specimens of collected titanium dioxide particles are referred to respectively as 0.25at % Er—$TiO_2$(Ex1-1), 0.5at % Er—$TiO_2$(Ex1-2), 1.0at % Er—$TiO_2$(Ex1-3) and 3.0at % Er—$TiO_2$(Ex1-4) to indicate the erbium doping ratios.

The structures of Ex1-1 through Ex1-4 were analyzed by means of an X-ray diffractometer (Model Philips PW1800: tradename, available from Philips Research Laboratories, Holland). The operating conditions of the X-ray diffractometer included an acceleration voltage using Cu—Kα rays of 40 kV, an electric current of 50 mA and a scanning rate of 0.15°/2θ·min. For the purpose of simplicity, the results obtained for Ex1-1, Ex1-2 and Ex1-4 are shown in FIG. 5 and will be described in detail below.

The surface of Ex1-4 was observed through a scanning electron microscope (FE-SEM, Model S-500: tradename, available from Hitachi, Japan).

Figure 5:
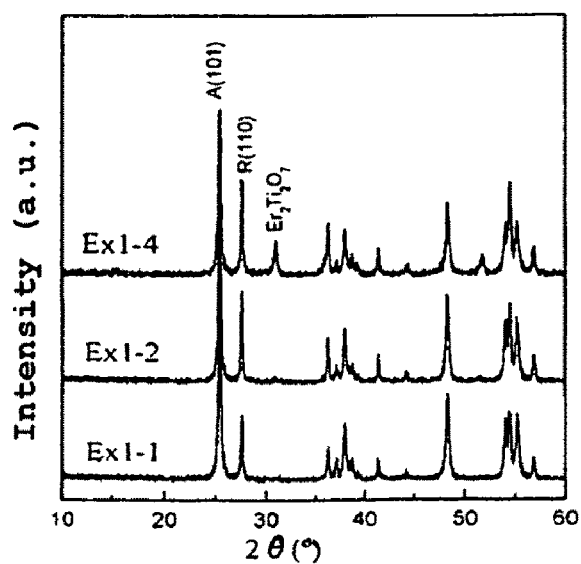
FIG. 5 is a graph illustrating the X-ray diffraction patterns of Ex1-1, Ex1-2 and Ex1-4.
Figure 6:
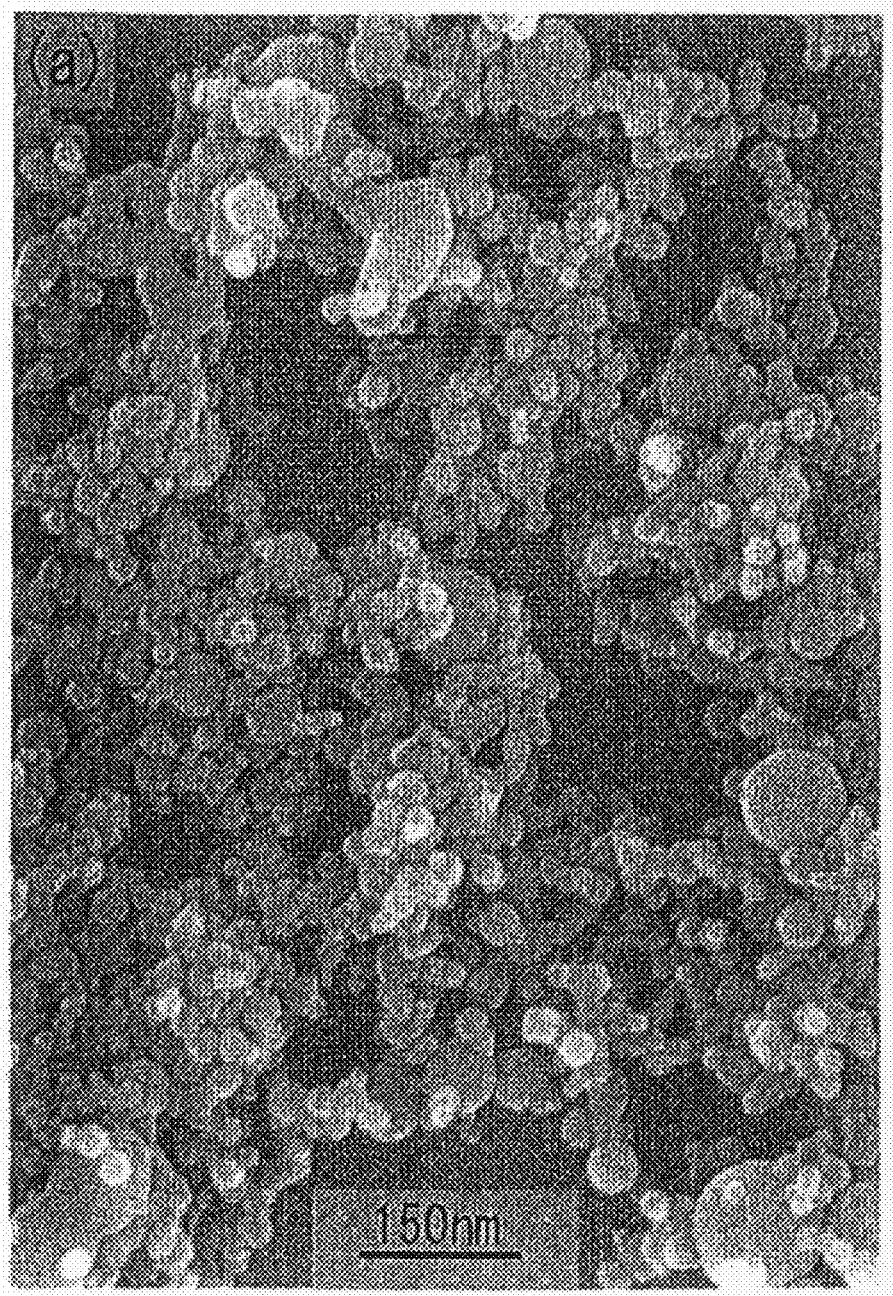
FIG. 6 is an electronmicrograph of Ex1-4.
Figure 7:
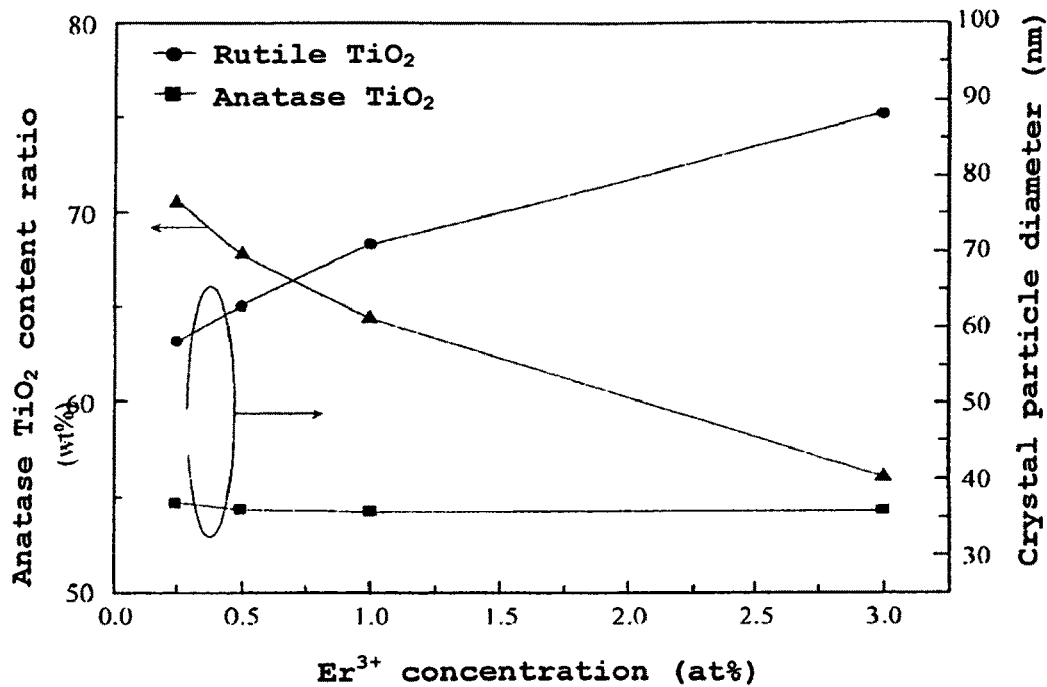
FIG. 7 is graph illustrating the $Er^{3+}$ concentration dependency of the anatase titanium dioxide content ratio and the crystal particle diameter.

The crystal sizes (particle diameters) of the specimens were determined by means of the Scherrer's formula, using the diffraction peaks of the (101) face that indicates the anatase type and the (110) face that indicates the rutile type obtained from FIG. 5. Additionally, the content ratio of the anatase titanium dioxide in the titanium dioxide of each of the specimens Ex1-1 through Ex1-4 was determined by means of the Spurr and Myers's formula. The results are shown in FIGS. 6 and 7 and will be described below in detail.

The cathode luminescence of Ex1-4 was measured by means of a scanning electron microscope (FE-SEM, Model S-4000SE: tradename, available from Hitachi, Japan) that was mounted by a cathode luminescence system.

Figure 8:
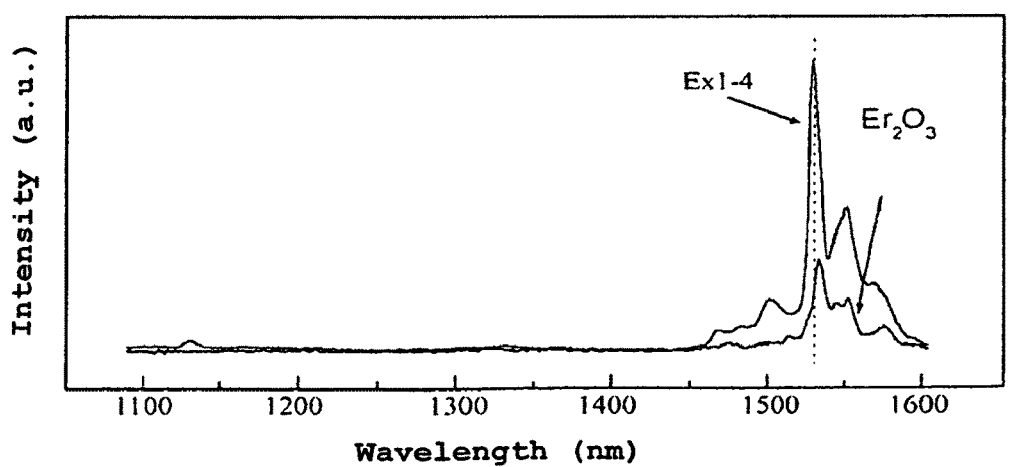
FIG. 8 is a graph illustrating the cathode luminescence of Ex1-4 and that of erbium oxide.

The cathode luminescence measuring conditions included an accelerating voltage of 20 kV and a wavelength range between 1,100 nm and 1,600 nm. For the purpose of comparison, the results obtained for erbium oxide are also shown in FIG. 8 and will be described below in detail.

FIG. 5 is a graph illustrating the X-ray diffraction patterns of Ex1-1, Ex1-2 and Ex1-4.

From the X-ray diffraction patterns, a peak of $Er_2Ti_2O_7$ of pyrochlore phase was detected from each of Ex1-3 (not shown in FIG. 3) and Ex1-4, which were doped with Er beyond 0.5 at %, from the X-ray diffraction patterns.

While it is theoretically possible to dope up to 5.0 at %, it may be safe to assume that rare earth ions were deposited when the content ratio of the rare earth element exceeded 0.5 at % because the manufacturing process was not optimized. However, it was found that it is possible to obtain titanium dioxide particles doped with a rare earth element with ease without providing a special manufacturing process when the content ratio is not less than 0 at % and not more than 0.5 at %.

Additionally, a peak of the (101) face that indicates anatase titanium dioxide and a peak of the (110) face that indicates rutile titanium dioxide were detected in each of the X-ray diffraction patterns of Ex1-l through Ex1-4. From the above, it was found that the obtained titanium dioxide particles of each of the specimens were a mixture of anatase titanium dioxide and rutile titanium dioxide.

Still additionally, it was also found the ratio of the peak intensity of the (101) face to that of the (110) face changes as a function of the doping ratio of Er ions. This will be described in greater detail hereinafter by referring to FIG. 7.

FIG. 6 is an electronmicrograph of Ex1-4.

From FIG. 6, it was found that the obtained particles had particle diameters between 5 nm and 100 nm. While some of the particles were agglomerated to show a diameter greater than 100 nm, it was found that the obtained particles were dispersed homogenously. As a result of an ICP emission analysis on Ex1-4, it was found that the Er content ratio was 5.71±0.02 wt %. This value approximately agreed with the fed-in content ratio of 3 at % at the time of preparing the precursor (or 5.85 wt %).

From the above finding, it was found that the doping ratio at the feed-in time is maintained by a manufacturing method according to the present invention.

FIG. 7 is graph illustrating the $Er^{3+}$ concentration dependency of the anatase titanium dioxide content ratio and the crystal particle diameter. From FIG. 7, it is found that the content ratio of anatase titanium dioxide decreases as the $Er^{3+}$ concentration increases. In other words, the content ratio of rutile titanium dioxide increases as the $Er^{3+}$ concentration increases. This is caused by the generation of oxygen holes. As a trivalent $Er^{3+}$ enters the position of a tetravalent $Ti^{4+}$, oxygen holes can be generated according to formula (1) below. formula (1):

$$Er_2O_3 + 3/2Ti_{Ti}^x \rightarrow 2Er'_{Ti} + V_O + 3/2TiO_2 \quad (1),$$

where $Ti_{Ti}^x$ is Ti located at a Ti site and $Er'_{Ti}$ is Er located at a Ti site, whereas $V_O$ represents an oxygen hole. It is known that rutile titanium dioxide has a capacity for generating oxygen holes greater than anatase titanium dioxide. In other words, rutile titanium dioxide is generated with priority as $Er^{3+}$ is dissolved in titanium dioxide to produce oxygen holes.

More specifically, both the basic structure of rutile titanium dioxide and that of anatase titanium dioxide are a series of oxygen octahedrons, in each of which a titanium atom is surrounded by six oxygen atoms. The number of linked edge sharing oxygen octahedrons is 2 in rutile titanium dioxide, whereas that of linked edge sharing oxygen octahedrons is 4 in anatase titanium dioxide.

As oxygen atoms of oxygen octahedrons are drawn out to produce oxygen holes in anatase titanium dioxide where the number of linked edge sharing oxygen octahedrons is greater than in rutile titanium dioxide, the repulsive energy between the positive ions ($Ti^{4+}$ in this case) located at the centers of two oxygen octahedrons becomes greater than in rutile titanium dioxide. Then, as a result, the crystal structure of anatase titanium dioxide becomes instable so that rutile titanium dioxide is generated with priority as a result.

While it was found that, while $Er^{3+}$ ions are deposited as pyrochlore phase when the $Er^{3+}$ concentration exceeds 0.5 at % from FIG. 5, anatase titanium dioxide decreases (and hence rutile titanium dioxide increases) regardless that the $Er^{3+}$ concentration exceeds 0.5 at %.

This suggests that $Er^{3+}$ ions are dissolved in rutile titanium dioxide at the time when cores are generated for titanium dioxide nano particles so that it is possible to substitute $Er^{3+}$ more for titanium dioxide particles beyond 0.5 at % without generating a pyrochlore phase by optimizing the manufacturing process. More specifically, it is possible to suppress the generation of a pyrochlore phase by improving the cooling rate of a plasma downstream section. Then, as a result, it is possible to obtain titanium dioxide particles doped with $Er^{3+}$ maximally to 5 at %.

FIG. 7 also suggests that the ratio of anatase titanium dioxide to rutile titanium dioxide can be controlled by controlling the manufacturing conditions.

Anatase titanium dioxide can be utilized as photocatalyst. On the other hand, rutile titanium dioxide has a refractive index and shows double refraction that are greater than anatase titanium dioxide so that it is expected to be used as host materials and find optical applications in the field of photonic crystals. Thus, it is possible to manufacture titanium dioxide particles having a phase composition doped with a rare earth element according to the user application with ease.

The particle diameter of the rutile titanium dioxide in the obtained titanium dioxide particles was not less than 60 nm and it was found that the particle diameter grows up to 90 nm as the $Er^{3+}$ concentration increases. The particle diameter of the anatase titanium dioxide in the obtained titanium dioxide particles was constantly about 35 nm regardless of the $Er^{3+}$ concentration.

Now, the obtained results are summarily shown in Table 2 below.

TABLE 2

| Specimen No. | Doping element | Doping ratio (at %) | deposition | anatase $TiO_2$ particle content: rutile $TiO_2$ content | anatase $TiO_2$ avg particle diameter (nm) | rutile $TiO_2$ avg particle diameter (nm) |
|---|---|---|---|---|---|---|
| Ex 1-1 | Er | 0.25 | no | 71:29 | 36 | 57 |
| Ex 1-2 | Er | 0.5 | no | 67:33 | 35 | 63 |
| Ex 1-3 | Er | 1.0 | yes | 64:36 | 35 | 71 |
| Ex 1-4 | Er | 3.0 | yes | 56:44 | 36 | 88 |

FIG. 8 is a graph illustrating the cathode luminescence of Ex1-4 and that of erbium oxide. It was found that the pattern of Ex1-4 differs from that of erbium oxide. It was confirmed that the pattern of Ex1-4 agree with that of currently known Er-doped titanium dioxide. More specifically, the strongest peak (half width 9 nm) of Ex1-4 was found at about 1,530 nm, which differs from the strongest peak (half width 22 nm) of erbium oxide that is located at about 1,534 nm.

From the above, the emission of light observed at about 1,530 nm was not attributable to free erbium oxide locally existing in titanium dioxide particles but attributable to $Er^{3+}$ substituted at the titanium sites of titanium dioxide. In other words, the substitution was successful.

EXAMPLE 2

Specimens of titanium dioxide particles (hereinafter referred to as Eu—$TiO_2$) doped with europium to different doping ratios were manufactured from respective liquid precursors, each containing a titanium alkoxide chelate complex, which by turn contains titanium tetra-n-butoxide (TTBO) as titanium alkoxide and diethanolamine as organic solvent for stabilizing TTBO, and a rare earth metal compound chelate complex, which by turn contains europium nitrate as rare earth metal non-alkoxide, citric acid and ammonia.

Each of the liquid precursors contained a titanium alkoxide chelate complex by turn containing 0.1 mol of TTBO and 0.4 mol of diethanolamine, a rare earth metal non-alkoxide chelate complex by turn containing europium nitrate to predetermined ratio (europium doping ratios of the specimens: 0.05 at %, 0.1 at %, 0.2 at %, 0.3 at %, 0.5 at %, 0.75 at % 1.0 at %, 2.0 at %, 3.0 at % and 5.0 at %), citric acid and ammonia and 20 ml of distilled water. Citric acid and europium nitrate were mixed to show a mol ratio of 1:1.

Since citric acid can hydrolyze TTBO in the presence of diethanolamine, the pH of the rare earth metal compound chelate complex was adjusted to about 9.0 for each of the specimens by adding ammonia after mixing europium nitrate and citric acid. A 25% ammonia solution (3 mL) was used for the adjustment of pH. Thereafter, europium nitrate was mixed with the rare earth metal compound chelate complex of each of the specimens whose pH had been adjusted to obtain the corresponding liquid precursor.

Table 3 below shows the manufacturing apparatus and the manufacturing conditions of this example, which will not be explained further because they are same as those of Example 1 except the O$_2$ flow rate of the precursor solution doped with europium to the ratio of 0.5 at % was changed from 10 to 90 L/min (more specifically, 10, 30, 40, 50, 70 and 90 L/min).

TABLE 3

| parameter | numerical value |
|---|---|
| central gas and flow rate | Ar, 30 L/min |
| sheath gas and flow rate | Ar + O$_2$, 90 L/min (O$_2$: 10, 30, 40, 50, 70, 90 L/min) |
| atomized gas and flow rate | Ar, 5 L/min |
| precursor supply rate | 4.5 g/min |
| induction power | 25 kW |
| chamber pressure | 500 torr |

The produced titanium dioxide particles were collected from the lateral wall of the stainless-steel-made reactor 210 (FIG. 2) and the filter 250 (FIG. 2) as specimens.

The specimens of collected titanium dioxide particles are referred to respectively as 0.05at % Eu—TiO$_2$(Ex2-1), 0.1at % Eu—TiO$_2$(Ex2-2), 0.2at % Eu—TiO$_2$(Ex2-3), 0.3at % Eu—TiO$_2$(Ex2-4), 0.5at % Eu—TiO$_2$(Ex2-5), 0.75at % Eu—TiO$_2$(Ex2-6), 1.0at % Eu—TiO$_2$(Ex2-7), 2.0at % Eu—TiO$_2$(Ex2-8), 3.0at % Eu—TiO$_2$(Ex2-9) and 5.0at % Eu—TiO$_2$(Ex2-10) to indicate the europium doping ratios.

The structures of Ex2-1 through Ex2-10 were analyzed by means of an instrument similar to the one used in Example 1 under similar operating conditions. For the purpose of simplicity, the results obtained for Ex2-5, Ex2-7, Ex2-9 and Ex2-10 and those obtained for non-doped titanium dioxide for purpose of comparison are shown in FIG. 9 and will be described in detail below.

Figure 9:
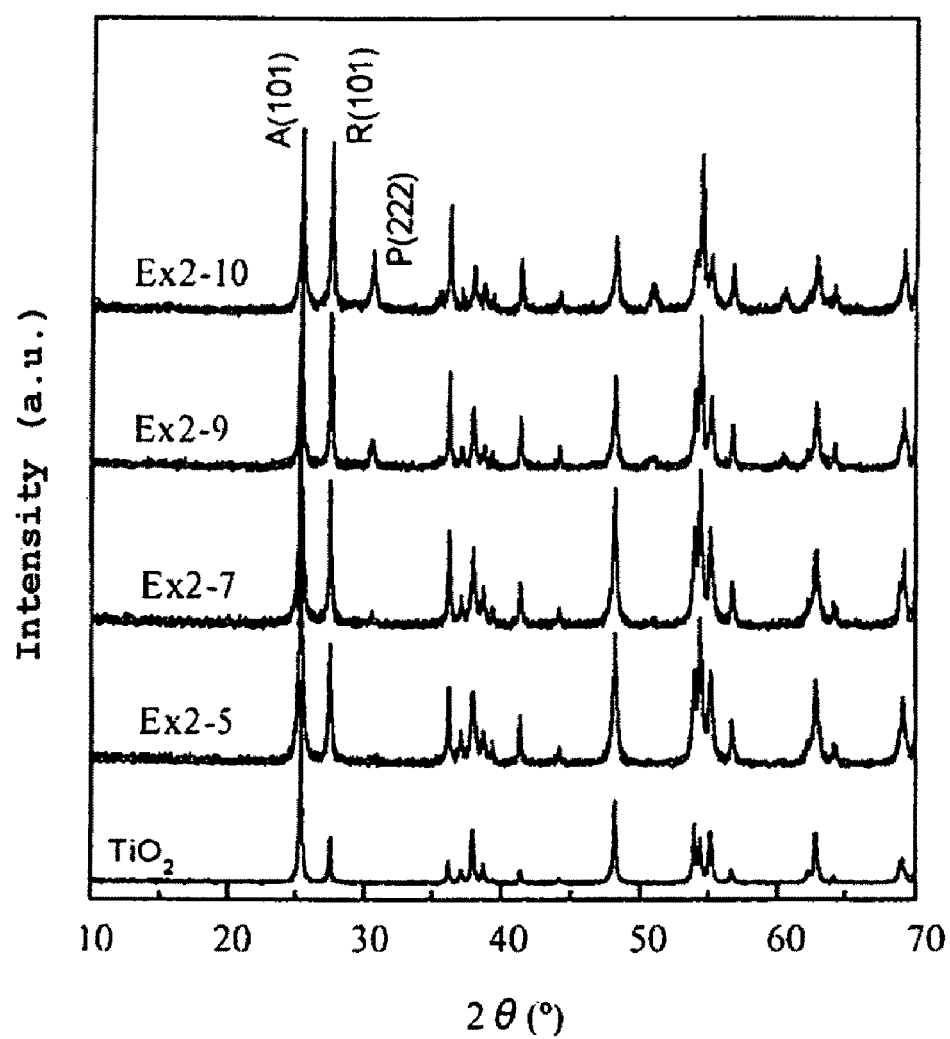
FIG. 9 is a graph illustrating the X-ray diffraction patterns of Ex2-5, Ex2-7, Ex2-9, Ex2-10 and non-doped titanium dioxide.

The crystal sizes (particle diameters) of the specimens were determined by means of the Scherrer's formula, using the diffraction peaks of the (101) face that indicates the anatase type and the (110) face that indicates the rutile type obtained from FIG. 9.

Figure 10:
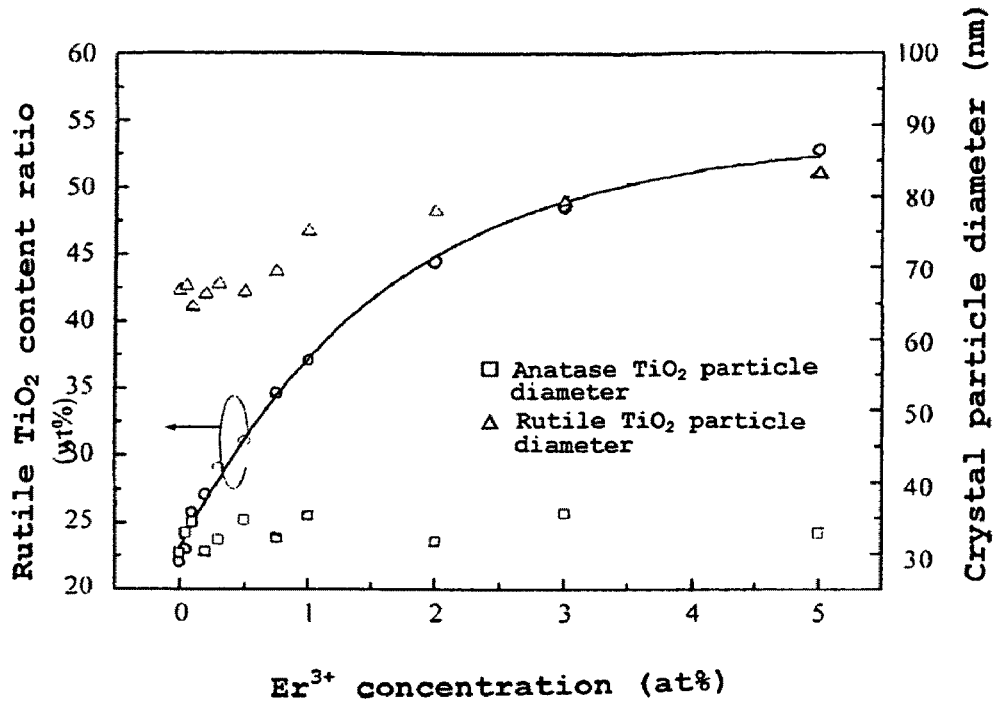
FIG. 10 is a graph illustrating the X-ray diffraction patterns of Ex2-5, Ex2-7, Ex2-9, Ex2-10 and non-doped titanium dioxide.
Figure 11:
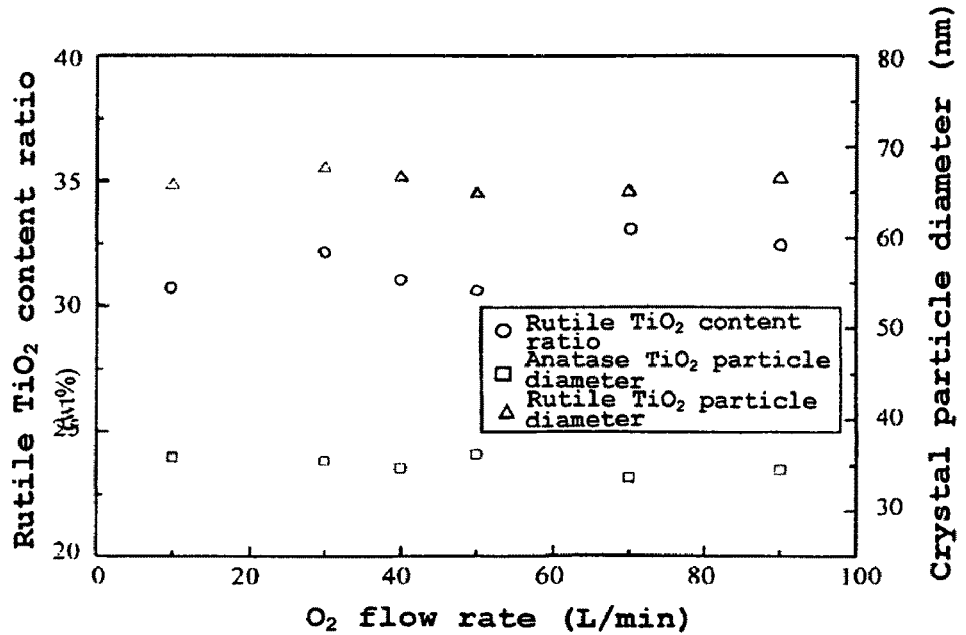
FIG. 11 is a graph illustrating the $O_2$ flow rate dependency of the content ratio and the crystal particle diameter of rutile titanium dioxide for Ex2-5.

Additionally, the content ratios of the anatase titanium dioxide and rutile titanium dioxide in the obtained titanium dioxide particles of the specimens were determined by means of the Spurr and Myers's formula as in Example 1. The results are shown in FIG. 10 and will be described below in detail. The structure of the specimens of Ex2-5 obtained for the different O$_2$ flow rates were also analyzed as in FIG. 9. The crystal sizes (particle diameters) and the content ratios of anatase titanium dioxide and rutile titanium dioxide of the specimens were determined by using the diffraction peaks. The obtained results are shown in FIG. 11 and will be described in detail below. The specimens Ex2-1 through Ex2-10 are subjected to a Raman spectroscopy by means of a Raman spectrometer (Model NR-1800: tradename, available from JASCO, Japan).

As for the conditions of the observation, the specimens were analyzed with a resolution of 1 cm$^{-1}$, using Ar$^+$ laser (wavelength: 514.5 nm; power; 50 mW) as the excitation light. The obtained results are shown for Ex2-1, Ex2-2, Ex2-4, Ex2-7, Ex2-9 and Ex2-10 in FIG. 12 along with the results obtained for Eu$_2$Ti$_2$O$_7$ of pyrochlore phase for the purpose of comparison and will be described in detail below.

The UV-visible diffusion/reflection spectrums of Ex2-1 through Ex2-10 were observed by means of a visible-UV absorption spectrometer (Jasco V-570: tradename, available from JASCO, Japan).

The observation wavelength was within a range between 200 nm and 800 nm. The results obtained for Ex2-1, Ex2-5 and Ex2-10 and also those obtained for non-doped titanium dioxide and Eu$_2$Ti$_2$O$_7$ of pyrochlore phase for the purpose of comparison are shown in FIG. 13 and will be described in detail below.

The excitation spectrum and the emission spectrum of the specimens of Ex2-5 were observed by means of a fluorescence spectrophotometer (F-4500: tradename, available from Hitachi, Japan). The obtained results are shown in FIG. 14 and will be described in detail below.

The photoluminescence spectrum was observed for Ex2-1 through Ex2-10 by means of a photoluminescence spectrometer (Renishaw plc, UK). The photoluminescence was observed for Ex2-1 through Ex2-10 by means of a He—Cd laser (wavelength 325 nm) for excitation light.

Figure 15:
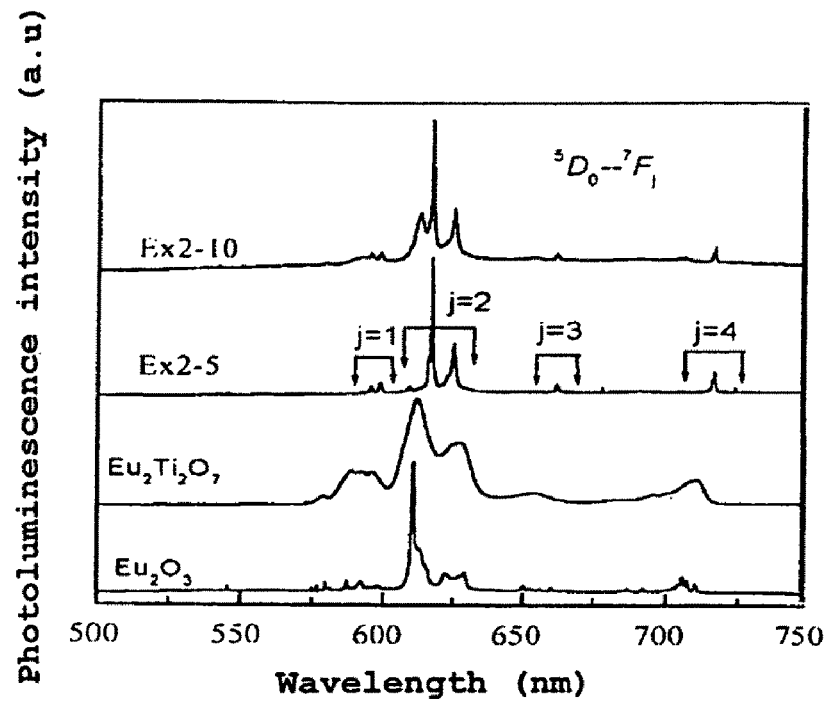
FIG. 15 is a graph illustrating the photoluminescence spectrums of Ex2-5, Ex2-10, $Eu_2O_3$ and $Eu_2Ti_2O_7$.
Figure 16:
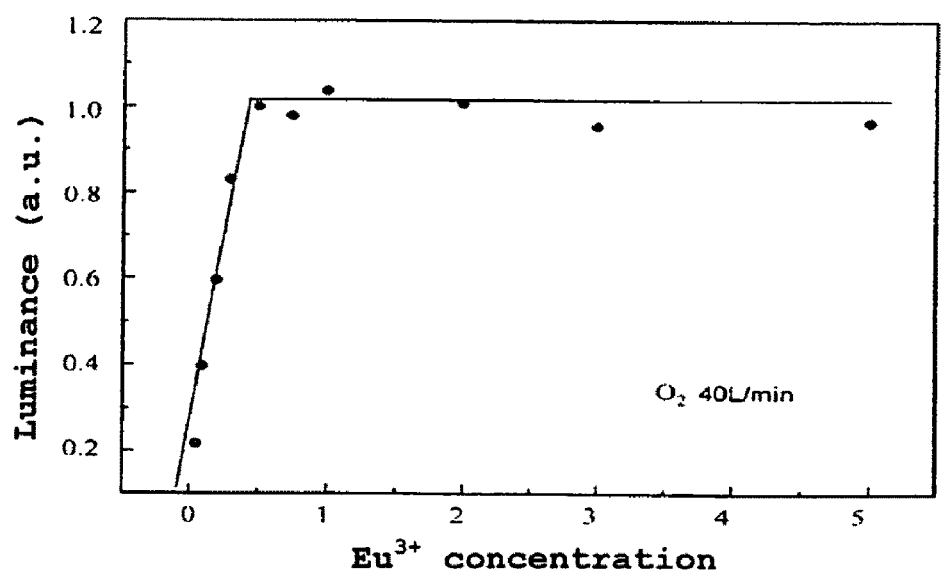
FIG. 16 is a graph illustrating the $Eu^{3+}$ concentration dependency of light emission intensity.
Figure 1:
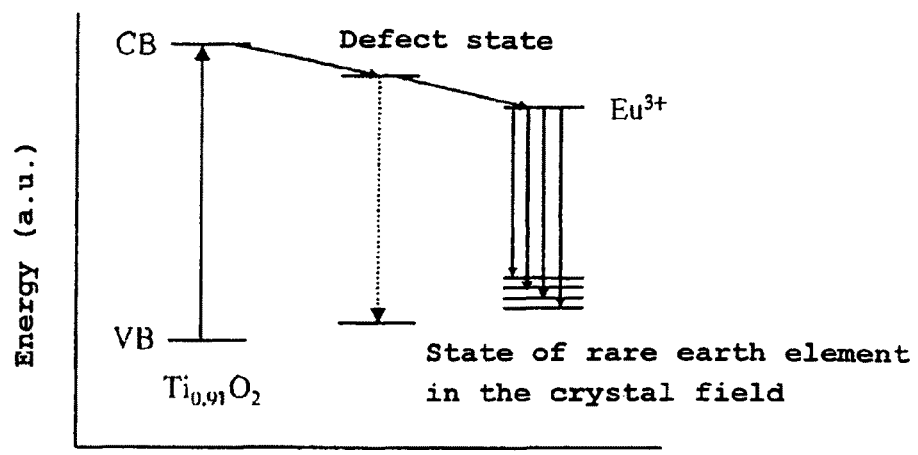

The results obtained for Ex2-5 and Ex2-10, and also those obtained for non-doped titanium dioxide and Eu$_2$Ti$_2$O$_7$ of pyrochlore phase, which were observed for the purpose of comparison are shown in FIGS. 15 and 16 and will be described in detail below.

FIG. 9 is a graph illustrating the X-ray diffraction patterns of Ex2-5, Ex2-7, Ex2-9, Ex2-10 and non-doped titanium dioxide.

As in Example 1, the peak (222) of Eu$_2$Ti$_2$O$_7$ of pyrochlore phase was detected from the X-ray diffraction patterns for Ex2-7, Ex2-9 and Ex2-10 that were doped with Eu beyond 0.5 at %. However, it is possible to dope up to 5.0 at % by optimizing the manufacturing process.

Additionally, as in Example 1, a peak of the (101) face that indicates anatase titanium dioxide and a peak of the (110) face that indicates rutile titanium dioxide were detected in each of the X-ray diffraction patterns. From the above, it was found that the obtained titanium dioxide particles of each of the specimens were a mixture of anatase titanium dioxide and rutile titanium dioxide.

Still additionally, it was also found the ratio of the peak intensity of the (101) face to that of the (110) face changes as a function of the doping ratio of Eu ions. This will be described in greater detail hereinafter by referring to FIG. 10.

FIG. 10 is a graph illustrating the Eu$^{3+}$ concentration dependency of the rutile titanium dioxide content ratio and the crystal particle diameter. From FIG. 10, it was found that the content ratio of rutile titanium dioxide increases as the Eu$^{3+}$ concentration increases.

More specifically, the content ratio of rutile titanium dioxide was 22 wt % in non-doped titanium dioxide and increased to 52 wt % when doped with Eu$^{3+}$ to a concentration of 5 at %. This means that it is possible to control the content ratio of anatase titanium dioxide to rutile titanium dioxide by controlling the manufacturing condition.

The fact that the content ratio of rutile titanium dioxide increases without saturation as the Eu$^{3+}$ concentration increases as in Example 1 suggests that Eu ions can be substituted by optimizing the manufacturing process.

The particle diameter of the rutile titanium dioxide in the obtained titanium dioxide particles was not less than 60 nm and it was found that the particle diameter grows up to 90 nm as the Eu$^{3+}$ concentration increases. The particle diameter of the anatase titanium dioxide in the titanium dioxide particles was constantly between 30 nm and 35 nm regardless of the Eu$^{3+}$ concentration.

FIG. 11 is a graph illustrating the O₂ flow rate dependency of the content ratio and the crystal particle diameter of rutile titanium dioxide for Ex2-5. It was found that none of the content ratio of rutile titanium dioxide, the particle diameter of rutile titanium dioxide and the particle diameter of anatase titanium dioxide were dependent on the O₂ flow rate during the manufacturing process (that is the rate at which O₂ is introduced into the sheath 240 (FIG. 2)). It was made clear from FIGS. 10 and 11 that the phase 5 composition and the crystal size (particle diameter) of the obtained titanium dioxide were dependent on the doping ratio of the rare earth element.

Table 4 below summarily shows the above results.

TABLE 4

| Specimen No. | Doping element | Doping ratio (at %) | O₂ flow rate (L/min) | deposition | anatase TiO₂ particle content: rutile TiO₂ content | anatase TiO₂ avg particle diameter (nm) | rutile TiO₂ avg particle diameter (nm) |
|---|---|---|---|---|---|---|---|
| Ex 2-1 | Eu | 0.05 | 40 | no | 77:23 | 33 | 68 |
| Ex 2-2 | Eu | 0.1 | 40 | no | 74:26 | 35 | 65 |
| Ex 2-3 | Eu | 0.2 | 40 | no | 72.5:27.5 | 30 | 67 |
| Ex 2-4 | Eu | 0.3 | 40 | no | 71:29 | 32 | 69 |
| Ex 2-5 | Eu | 0.5 | 10 to 90 | no | 69:31 | 35 | 68 |
| Ex 2-6 | Eu | 0.75 | 40 | yes | 66:34 | 32 | 70 |
| Ex 2-7 | Eu | 1.0 | 40 | yes | 62.5:37.5 | 35 | 75.5 |
| Ex 2-8 | Eu | 2.0 | 40 | yes | 56:44 | 31 | 78 |
| Ex 2-9 | Eu | 3.0 | 40 | yes | 52.5:47.5 | 35 | 80 |
| Ex 2-10 | Eu | 5.0 | 40 | yes | 47.5:52.5 | 33 | 83 |

Figure 12:
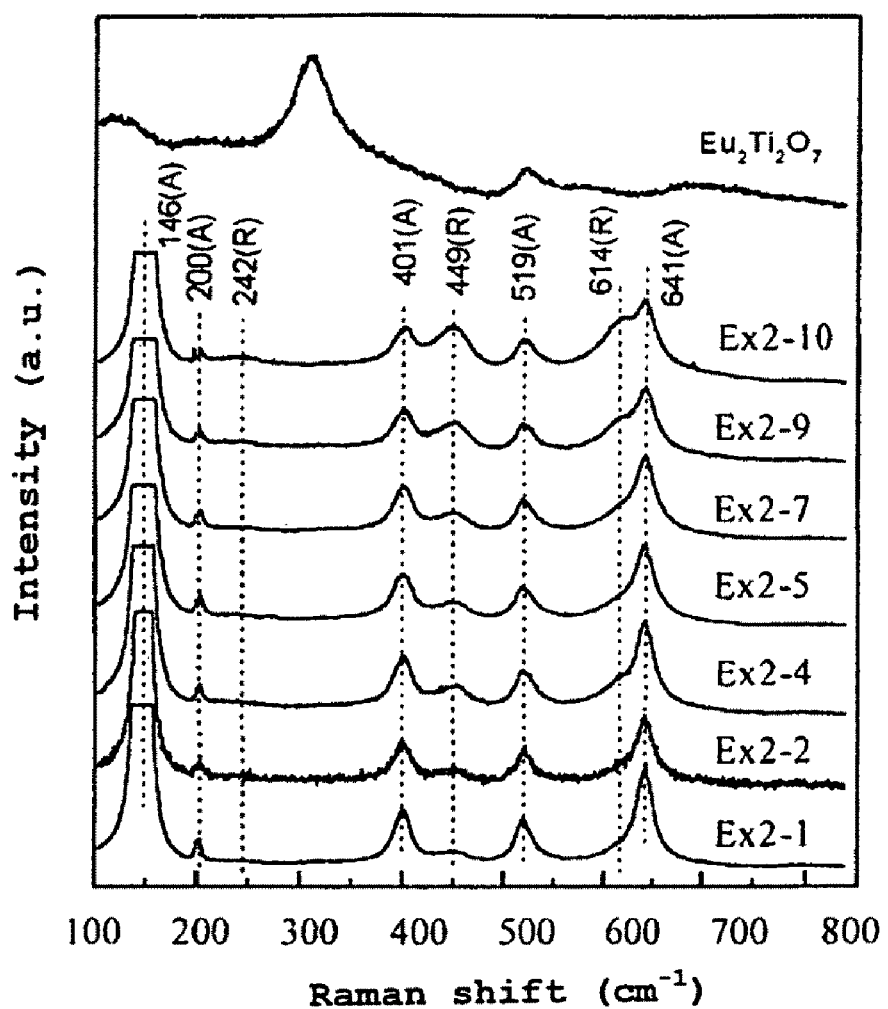
FIG. 12 is a graph illustrating the Raman spectrums of Ex2-1, Ex2-2, Ex2-4, Ex2-7, Ex2-9, Ex2-10 and $Eu_2Ti_2O_7$.
Figure 1:
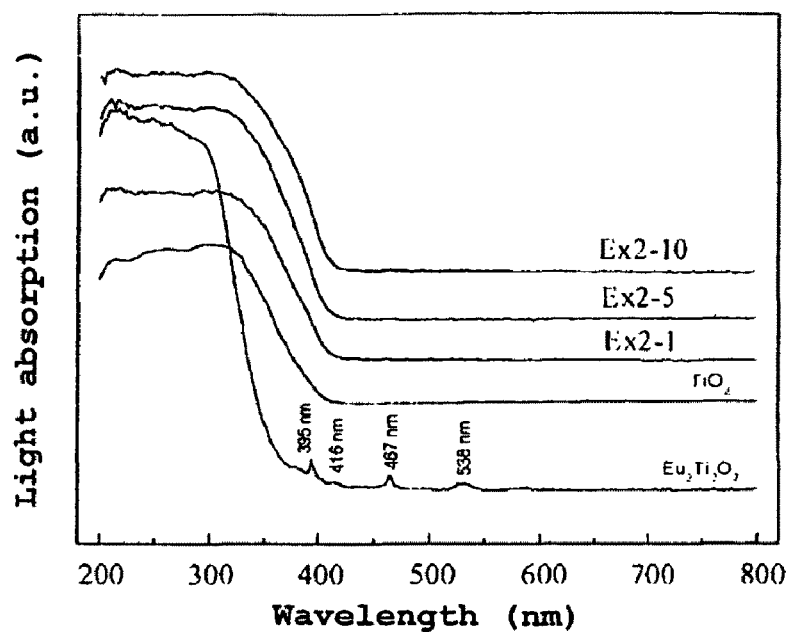
Figure 1:
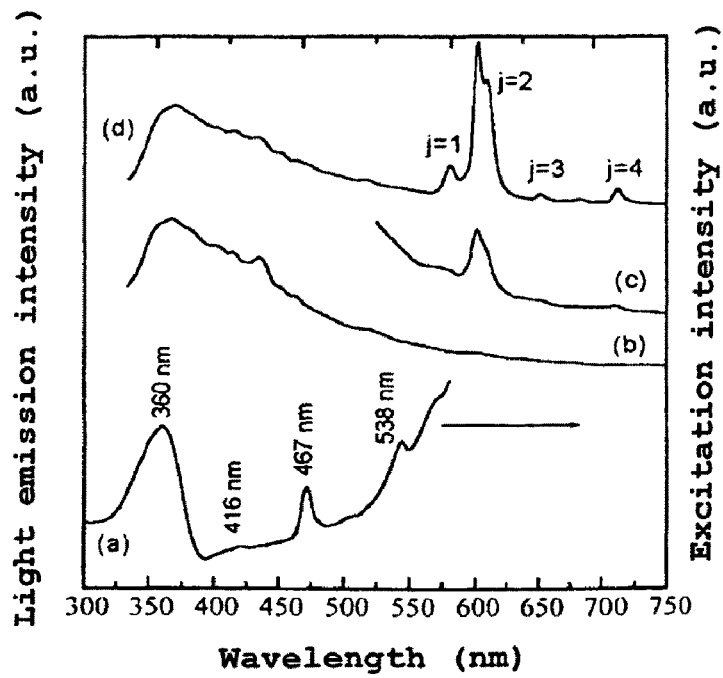

FIG. 12 is a graph illustrating the Raman spectrums of Ex2-1, Ex2-2, Ex2-4, Ex2-7, Ex2-9, Ex2-10 and $Eu_2Ti_2O_7$.

$Eu_2Ti_2O_7$ showed a diffused weak Raman scattering within a range between 100 cm$^{-1}$ and 800 cm$^{-1}$. On the other hand, all the specimens of titanium dioxide doped with $Eu^{3+}$ (Ex2-1 through Ex2-10) showed a characteristic peak.

More specifically, the scatterings at 146 cm$^{-1}$ (Eg mode), 200 cm$^{-1}$ (Eg mode), 401 cm$^{-1}$ (Blg mode), 519 cm$^{-1}$ (Blg mode) and 641 cm$^{-1}$ (Eg mode) agreed with those of anatase titanium dioxide, where the scatterings at 449 cm$^{-1}$ (Eg mode) and 614 cm$^{-1}$ (Alg mode) agreed with those of rutile titanium dioxide.

The scattering at 143 cm$^{-1}$ (Blg mode) of rutile titanium dioxide did not show any overlapping with the scattering at 146 cm$^{-1}$ (Eg mode) of anatase titanium dioxide.

The peak intensity of the Eg mode (449 cm$^{-1}$) and that of the Alg mode (614 cm$^{-1}$) of rutile titanium dioxide increased as the $Eu^{3+}$ concentration increased. This fact agrees with that the content ratio of rutile titanium dioxide increases as the $Eu^{3+}$ concentration increases as pointed out above by referring to FIG. 10. Note that no peak of $Eu_2Ti_2O_7$ was observed for Ex2-10. It maybe safe to presume that this is because the pyrochlore phase contained in Ex2-10 was very small.

FIG. 13 is a graph illustrating the UV-visible diffusion/reflection spectrums of Ex2-1, Ex2-5, Ex2-10, non-doped titanium dioxide and $Eu_2Ti_2O_7$.

All the spectrums had an absorption band at about 405 nm. It was confirmed that the absorption band corresponds to a band gap of about 3.06 eV, which is same as the band gap of titanium dioxide.

On the other hand, $Eu_2Ti_2O_7$ showed additional absorptions at 395 nm, 416 nm, 467 nm and 538 nm. These correspond to the inner shell transition $4f \rightarrow 4f$ of $Eu^{3+}$.

Meanwhile, none of Ex2-1, Ex2-5 and Ex2-10 showed peaks that correspond to the inner shell transition $4f \rightarrow 4f$ of $Eu^{3+}$. This is because none of the specimens contain $Eu^{3+}$ to such an extent that allows the peaks of $Eu^{3+}$ to be detected and the transition process that causes the absorption of $Eu^{3+}$ 395 nm that shows the highest intensity was quenched by the large absorption (about 405 nm) of titanium dioxide.

FIG. 14 is graph illustrating the excitation spectrum observed by monitoring the 617 nm emission of Ex2-5 and non-doped titanium dioxide excited in various different conditions.

Referring to FIG. 14, the spectrum (a) is the excitation spectrum observed when Ex2-5 was excited by light having a wavelength of 617 nm. Note that the wavelength of 617 nm corresponds to radiation of $Eu^{3+}$ due to the $^5D_0 \rightarrow ^7F_2$ transition.

The spectrum (a) showed peaks at 360 nm, 416 nm, 467 nm and 538 nm. The peaks of 416 nm, 467 nm and 538 nm out of the four peaks agreed with the peaks of the pyroclore phase of the UV-visible absorption spectrum described above by referring to FIG. 13.

In other words, the three peaks correspond respectively to the $^7F_{0,1} \rightarrow ^5D_3$, $^7F_{0,1} \rightarrow ^5D_2$ and $^7F_{0,1} \rightarrow ^5D_1$ transitions of $Eu^{3+}$. The peak of 360 nm in the spectrum (a) agreed with the absorption band of non-doped titanium dioxide described above by referring to FIG. 13.

From these, it was shown that $Eu^{3+}$ was efficiently excited by way of the titanium dioxide host lattice. Note that, although the right-hand skirt of the peak of 360 nm partly overlaps the peak of 416 nm, it does not completely overlap the latter peak.

The spectrum (b) is the photoluminescence spectrum that is observed when non-doped titanium dioxide is excited with light of wavelength not higher than 360 nm (wavelength equal to 360 nm here). The spectrum (b) did not show any characteristic peak.

The spectrum (d) is the photoluminescence spectrum that is observed when Ex2-5 is excited with light of wavelength not higher than 360 nm (wavelength equal to 360 nm here). Unlike the spectrum (b), it showed peaks attributable to $Eu^{3+}$ within a wavelength range between 590 nm and 720 nm.

More particularly, the peaks of the spectrum (d) agree with the $^5D_0 \rightarrow ^7F_j$ (j=1 through 4) transitions of electrons of excited $Eu^{3+}$.

These peaks can be visually identified as pure red. They are very sharp and show a high intensity. A light emitting material that shows such a clear red can be, for instance, effectively applied to white LEDs.

The spectrum (c) is the photoluminescence spectrum that is observed when Ex2-5 is excited with light having a wavelength greater than the absorption edge of non-doped titanium dioxide (>450 nm) (wavelength equal to 457 nm here).

Again, the spectrum (c) showed peaks attributable to $Eu^{3+}$ within a wavelength range between 590 nm and 720 nm.

Thus, it is possible to take out emitted light attributable to a rare earth element by irradiating titanium dioxide particles with light of a wavelength that can excite rare earth elements (wavelength equal to 457 nm here).

However, the peak intensities of the spectrum (c) are smaller that those of the spectrum (d) and the peaks were broader than those of the spectrum (d). From this fact, it was found that titanium dioxide particles that are doped with a rare earth element according to the present invention can easily give rise to a move of energy from the host titanium dioxide to rare earth ions.

From above, it was also found that europium-doped titanium dioxide according to the present invention can easily excite $Eu^{3+}$ by means of light having the absorption wavelength of titanium dioxide to make it possible to take out emitted light attributable to $Eu^{3+}$.

FIG. 15 is a graph illustrating the photoluminescence spectrums of Ex2-5, Ex2-10, $Eu_2O_3$ and $Eu_2Ti_2O_7$. Both Ex2-5 and Ex2-10 showed peaks that are different from the peaks of $Eu_2O_3$ and $Eu_2Ti_2O_7$. These peaks are those of emitted red light that can be observed with naked eyes.

This fact suggests that the local environment of $Eu^{3+}$ in Eu2-5 and in Eu2-10 differs from that of $Eu^{3+}$ in $Eu_2O_3$ and $Eu_2Ti_2O_7$. In other words, the radiation from Ex2-5 and Ex2-10 are not attributable to $Eu_2O_3$ and $Eu_2Ti_2O_7$ but to $Eu^{3+}$ substituted for titanium at part of the titanium sites in the titanium dioxide lattice.

A peak similar to a peak attributable to $Eu_2Ti_2O_7$ was observed at 612 nm in the spectrum of Eu2-10. As described above by referring to FIG. 9, this is attributable to the deposition of a pyroclore phase due to excessive $Eu^{3+}$.

The spectrum of Eu2-5 showed the peaks of $^5D_0 \rightarrow ^7F_j$ (j=1 through 4). It is known that $^5D_0 \rightarrow ^7F_1$ rays (599 nm, three Stark splits) are produced from a magnetic dipole transition.

On the other hand, it is known that $^5D_0 \rightarrow ^7F_2$ rays (617 nm, five Stark dissociations) are produced from an electric dipole transition. A magnetic dipole transition can take place while an electric dipole transition is suppressed. An electric dipole transition can take place only when $Eu^{3+}$ is not at the center of inversion but occupies lattice positions and is influenced by local symmetry.

As seen from the spectrum of Ex2-5 in FIG. 15, the peak intensity of the electric dipole transition of Eu-doped titanium dioxide that is observed according to the present invention is greater than that of the magnetic dipole transition. This fact suggests that $Eu^{3+}$ is located at titanium sites that are not at the center of inversion in the $TiO_2$ host lattice in Eu-doped titanium dioxide according to the present invention.

It is well known that the relative intensity ratio of the $^5D_0 \rightarrow ^7F_1$ transition to the $^5D_0 \rightarrow ^7F_2$ transition is highly sensitive to the local symmetry of $Eu^{3+}$. In Example 2, the intensity ratio of the $^5D_0 \rightarrow ^7F_2$ transition (617 nm) to the $^5D_0 \rightarrow ^7F_1$ transition (599 nm) is constant and equal to about 9.7 in each of Ex2-1 through Ex2-10.

This fact suggests that the local environment of $Eu^{3+}$ in each of the specimens is such that it is located at the lattice position (or titanium sites) in the $TiO_2$ host lattice.

FIG. 16 is a graph illustrating the $Eu^{3+}$ concentration dependency of light emission intensity.

The light emission intensity due to the $^5D_0 \rightarrow ^7F_2$ transition (617 nm) of each of Ex2-1 through Ex2-10 was normalized by the light emission intensity of Ex2-5 on the basis of FIG. 15 and plotted in FIG. 16.

The luminance increased as the $Eu^{3+}$ concentration increased up to 0.5 at % and then remained at a constant level beyond 0.5 at %. This is because $Eu^{3+}$ that contributes to emission light (or $Eu^{3+}$ located at titanium sites in the $TiO_2$ host lattice) is deposited as pyrochlore phase when the $Eu^{3+}$ concentration exceeds 0.5 at % as described above by referring to FIG. 9.

Since the luminance increases in proportion to the concentration of $Eu^{3+}$ substituted at titanium sites, it is possible to obtain a light emitting material showing a more desirable luminance level if it is possible to dope $Eu^{3+}$ ions up to 5.0 at % by optimizing the manufacturing process.

As described above in detail by way of examples and drawings, the present invention succeeded in producing titanium dioxide in which a rare earth element is substituted at titanium sites in the titanium dioxide crystal lattice thereof to a predetermined level and hence titanium dioxide doped with a rare earth element. Thus, as a result, the present invention succeeded in producing a fluorescence emitting substance from which fluorescence can be highly efficiently taken out by means of a rare earth element. Namely, the applicability of the present invention is very high in many industrial fields as pointed out below.

INDUSTRIAL APPLICABILITY

Titanium dioxide particles doped with a rare earth element is described above in detail. It has been found that a rare earth element can be substituted with ease at titanium sites in a $TiO_2$ host lattice without requiring any complex manufacturing process within a concentration range between 0 and 0.5 at %. It is also possible to substitute up to 5.0 at % by optimizing the manufacturing process.

Additionally, it is possible to take out light emitted from titanium dioxide particles doped with a rare earth element that is attributable to rare earth ions simply by irradiating them with light having the absorption wavelength of titanium dioxide. Thus, it is possible to utilize titanium dioxide particles doped with a rare earth element as light emitting material by exploiting this light emitting characteristic. Light emitting materials in the form of nano particles can find applications in the field of light emitting devices that can be used in white LEDs, plasma displays, optical amplifiers, micro lasers, television screens, lighting equipment and so on.

The invention claimed is:

1. A method of manufacturing titanium dioxide particles doped with a rare earth element, comprising:
   preparing a liquid precursor containing a titanium source and a rare earth metal source, a doping ratio of the rare earth element in said liquid precursor being within a range more than 0 at % and not more than 5.0 at %;
   generating thermal plasma; and
   providing the liquid precursor into the thermal plasma,
   wherein the rare earth element is substituted for at least one titanium site in a titanium dioxide lattice and a crystal structure of the titanium dioxide is maintained.

2. The method according to claim 1, wherein the doping ratio of the rare earth element in said liquid precursor is within the range more than 0 at % and not more than 0.5 at %.

3. The method according to claim 1, wherein said titanium source is a titanium alkoxide chelate complex and said rare earth metal source is a rare earth metal compound chelate complex.

4. The method according to claim 3, wherein
   said titanium alkoxide chelate complex contains:
   a titanium alkoxide selected from the group consisting of titanium ethoxide, titanium propoxide and titanium butoxide; and
   an organic solvent selected from the group consisting of diethanolamine, triethanolamine and acetylacetone; and
   said rare earth metal compound chelate complex contains:

a rare earth metal non-alkoxide selected from the group consisting of rare earth nitrates, rare earth chlorides, rare earth sulfates and rare earth acetates,
citric acid or ethylenediaminetetraacetate; and
ammonia or
a rare earth metal alkoxide selected from the group consisting of rare earth metal ethoxides, rare earth metal propoxides and rare earth metal butoxides; and
an organic solvent selected from the group consisting of diethanolamine, triethanolamine and acetylacetone.

5. The method according to claim 1, wherein said titanium source is a titanium trichloride solution and the rare earth metal source is a rare earth metal alkoxide.

6. The method according to claim 5, wherein said rare earth metal alkoxide is selected from the group consisting of rare earth metal ethoxides, rare earth metal propoxides and rare earth metal butoxides.

7. The method according to claim 1, wherein said rare earth element is selected from the group consisting of cerium, praseodymium, neodymium, promethium, samarium, europium, gadolinium, terbium, dysprosium, holmium, erbium, thulium and ytterbium.

8. The method according to claim 4, wherein,
when said rare earth metal compound chelate complex contains a rare earth metal non-alkoxide selected from the group consisting of rare earth nitrates, rare earth chlorides, rare earth sulfates and rare earth acetates, citric acid or ethylenediaminetetraacetate and ammonia,
the method further includes:
mixing the rare earth metal non-alkoxide and the citric acid or ethylenediaminetetraacetate;
mixing the ammonia; and
mixing the titanium alkoxide chelate complex.

9. The method according to claim 8, wherein
said mixing of the ammonia is conducted as to make the pH of said rare earth metal compound chelate complex equal to 9.0.

10. The method according to claim 1, wherein
said generating of the thermal plasma is conducted to generate oxygen-gas-containing thermal plasma by means of a plasma generation system selected from the group consisting of an RF induction plasma system, a DC arc plasma system, a DC RF hybrid plasma system and a microwave induction plasma system.

11. The method according to claim 1, wherein
said providing of the liquid precursor is conducted to atomize the liquid precursor.

* * * * *